(12) United States Patent
Underwood

(10) Patent No.: US 7,234,221 B2
(45) Date of Patent: Jun. 26, 2007

(54) METHOD OF CLOSING A PARTITION OPENING

(75) Inventor: Larry Cullen Underwood, Canton, GA (US)

(73) Assignee: L.L. Culmat, L.P., Woodstock, GA (US)

( * ) Notice: Subject to any disclaimer, the term of this patent is extended or adjusted under 35 U.S.C. 154(b) by 409 days.

(21) Appl. No.: 10/995,977

(22) Filed: Nov. 23, 2004

(65) Prior Publication Data

US 2005/0087540 A1    Apr. 28, 2005

Related U.S. Application Data

(62) Division of application No. 10/283,805, filed on Oct. 30, 2002, now Pat. No. 6,883,679.

(51) Int. Cl.
B23P 11/02    (2006.01)
(52) U.S. Cl. ........................................................ 29/450
(58) Field of Classification Search ................. 29/446, 29/450, 451, 453, 521; 220/233, 243, 246, 220/250, 251, 345.1, 345.3, 345.2, 348, 350, 220/802, DIG. 19; 229/125.12; 24/458, 24/545, 555, 556, 557, 561; 52/742.1, 742.13, 52/745.15, 745.16; 264/46.6
See application file for complete search history.

(56) References Cited

U.S. PATENT DOCUMENTS

| 785,460 | A | * | 3/1905 | Whitsett ........................ 24/3.1 |
|---|---|---|---|---|
| 2,137,653 | A | * | 11/1938 | Lundberg ...................... 24/458 |
| 2,137,657 | A | * | 11/1938 | Ross ............................. 24/458 |
| 2,137,883 | A | * | 11/1938 | Ross ............................. 24/458 |
| 2,150,497 | A | * | 3/1939 | Fernberg ....................... 24/458 |
| 2,200,047 | A | * | 5/1940 | Tinnerman ................... 248/73 |
| 3,006,049 | A | | 10/1961 | Jansson |
| 3,236,409 | A | | 2/1966 | Cross et al. |
| 3,628,762 | A | | 12/1971 | Williams et al. |
| 3,637,104 | A | * | 1/1972 | Dutnell ........................ 220/250 |
| 3,739,936 | A | | 6/1973 | Jones, Jr. |
| 3,904,071 | A | | 9/1975 | Stearns |
| 3,954,243 | A | * | 5/1976 | Sharp et al. ................. 248/235 |
| 4,003,493 | A | | 1/1977 | Wells et al. |
| 4,037,754 | A | * | 7/1977 | Wilhelmi et al. ........ 220/254.2 |
| 4,053,084 | A | | 10/1977 | Anderson |
| 4,113,134 | A | | 9/1978 | Heintzelman |
| 4,162,742 | A | * | 7/1979 | Vogt ............................ 220/269 |
| 4,463,870 | A | | 8/1984 | Coburn, Jr. et al. |
| 4,646,932 | A | | 3/1987 | Masler |
| 4,728,068 | A | | 3/1988 | Rivkin |
| 4,746,032 | A | | 5/1988 | Huang |

(Continued)

*Primary Examiner*—David P. Bryant
*Assistant Examiner*—Christopher M. Koehler
(74) *Attorney, Agent, or Firm*—Brinks Hofer Gilson & Lione

(57) ABSTRACT

A closure for an opening through a partition includes a flange having first and second surfaces and a first extension on a first edge, the flange having a perimeter greater than the opening perimeter. A barrier protrudes from the first surface of the flange and is surrounded by a wall having an outside surface perimeter approximating the opening perimeter. A spring member has a proximal end coupled to a second edge of the barrier and a distal end overlying a portion of the flange first surface including the first extension. The spring distal end has a contact portion confronting the first extension and a knob for manipulating the closure toward the opening.

15 Claims, 6 Drawing Sheets

U.S. PATENT DOCUMENTS

| | | | | |
|---|---|---|---|---|
| 4,938,378 A | * | 7/1990 | Kraus | 220/789 |
| 4,998,642 A | * | 3/1991 | Kraus | 220/782 |
| 5,702,133 A | | 12/1997 | Pavur et al. | |
| 6,296,136 B1 | | 10/2001 | Huet | |
| 6,464,101 B1 | | 10/2002 | Siragusa et al. | |
| 6,588,071 B2 | | 7/2003 | Gramss | |

* cited by examiner

METHOD OF CLOSING A PARTITION OPENING

CROSS-REFERENCE TO RELATED APPLICATIONS

The present application is a divisional application of U.S. Ser. No. 10/283,805 filed Oct. 30, 2002 now U.S. Pat. No. 6,883,679.

BACKGROUND OF THE INVENTION

The present invention relates to a hole closing plug, sometimes called an obturator, for closing an aperture in a barrier such as a metal door, water craft body panel, automobile body panel, double walled appliance wall and exterior wall of a fixed or mobile residence, and the like. The present invention has particular utility for closing an opening through a partition leading to an enclosed volume that is to be filled with insulating foam.

Hole closing plugs are used to tightly close apertures generally produced in barriers, partitions, dividers and walls that can be part of an overall enclosure and can be formed of a variety of materials including sheet steel. The hole closing plugs are typically formed of an injection molded thermoplastics material that are at least somewhat flexible and resilient. The hole closing plugs of the prior art typically have a central portion surrounded by a peripheral rim adapted to come into tight abutment against the periphery of the aperture sought to be closed. The hole closing plugs are typically retained in place by flanges or lugs that engage the periphery of the aperture. Examples are to be found in U.S. Pat. Nos. 3,739,936; 4,053,084; 4,037,754; and 6,296,136.

Some hole closing plugs, shown for example in U.S. Pat. Nos. 2,173,843; 3,904,071; and 4,915,252, include handles by which the plugs can be manipulated during insertion. Other hole closing plugs, shown for example in U.S. Pat. No. 4,640,434, are intended to be trimmed after insertion into the hole. While each of these structures have their own features and functions, there is still a need for a hole closing plug that can be stably pre-positioned adjacent to a hole and quickly moved into a hole closing position with a simple movement. There is also a need for a hole closing plug that can be manipulated with a knob or other protrusion that is removable subsequent to insertion of the closure into the opening. There is particularly a need for such a hole closing plug from which the handle can be removed quickly. There is also a particular need for such a hole closing plug that can be used, for example, to close a hole in a hollow wall or door of a structure, such as a refrigerator or other appliance, mobile home or recreational water craft, in which one desires to place insulation, particularly foaming insulation which is installed in a liquid form and then permitted to expand to fill the space within the hollow wall, preferably prior to any expansion of the foam so that the insulation is retained within the space rather than spilling out.

SUMMARY OF THE INVENTION

The various structural and functional criteria previously identified are satisfied by a hole closing plug of the present invention which generally includes a flange having first and second surfaces joined by an edge defining a perimeter. A first extension is fixed to and extends outward from a first segment on the perimetral edge. A barrier protrudes from the first surface of the flange, the barrier being surrounded by a wall having an outside surface of a dimension approximating the dimensions of the opening sought to be closed by the plug. A spring member has a proximal end coupled to the barrier at a location remote from the first segment. The spring member has a distal end overlying a portion of the flange first surface including the first extension. The distal end of the spring includes a contact portion confronting the first extension and a knob facilitating closure of an opening with the plug.

The hole closing plug of the present invention is preferably made as a single unitary structure of an elastic polymeric resin such as polystyrene, high density polyethylene, or ABS that is sufficiently retentive of its initial molded form as to provide a spring force that will apply sufficient force normal to the partition surface to frictionally hold the plug at a fixed position in the absence of a disturbing lateral force. The elastic memory of the spring is sufficient to redeploy the barrier into the partition opening when the plug is moved into alignment with the opening by applying a small force to the knob.

When used in a foam insulation process, a plug according to the present invention can be pre-positioned so that the first extension and distal end of the spring member are located on opposite sides of the partition and the barrier is positioned adjacent to the partition opening with the proximal end of the spring member extending through the partition opening. The spring force can frictionally hold the plug at a fixed position while the partition is incorporated into a structure requiring insulation. Immediately subsequent to the introduction of the foam plastic, a lateral force can be applied to the proximal end of the spring member in a direction and in sufficient magnitude to cause the barrier to slide toward alignment with the partition opening. The spring member then biases the barrier toward insertion into the partition opening to block any exodus of foam from the structure. Once the foam plastic is sufficiently form stable, the distal portion of the spring to be severed from the barrier portion, and the barrier and flange portions will be retained in place by virtue of the continuing pressure applied by the trapped foam insulation.

In a preferred embodiment of the molded plug of the present invention, a first extension of the flange includes a remote end portion and an arched portion coupling the remote end portion to the flange with the contact portion of the spring member overlying the arched portion of the first extension. A handle is preferably coupled to the second surface of the flange on the reverse side from the barrier portion, the handle lying generally in a plane perpendicular to the flange second surface to permit easy introduction of the plug into the partition opening. Using the handle, the spring member can be inserted through the partition opening and located so that the first extension and distal end of the spring member are located on opposite sides of the partition and the barrier is positioned adjacent to the partition opening with the proximal end of the spring member extending through the partition opening. A molded plug of the present invention preferably has an outward extension or knob on the distal end of the spring member positioned more remote from the proximal end than the contact portion, the knob being spaced farther from the first extension than the contact portion to facilitate manipulation of the plug.

Other features and advantages of the present invention will be come apparent from the following discussion of a preferred embodiment of the present invention, exemplifying the best mode of practicing the present invention, which is illustrated in the accompanying drawings.

DESCRIPTION OF PREFERRED EMBODIMENT

Figure 1:
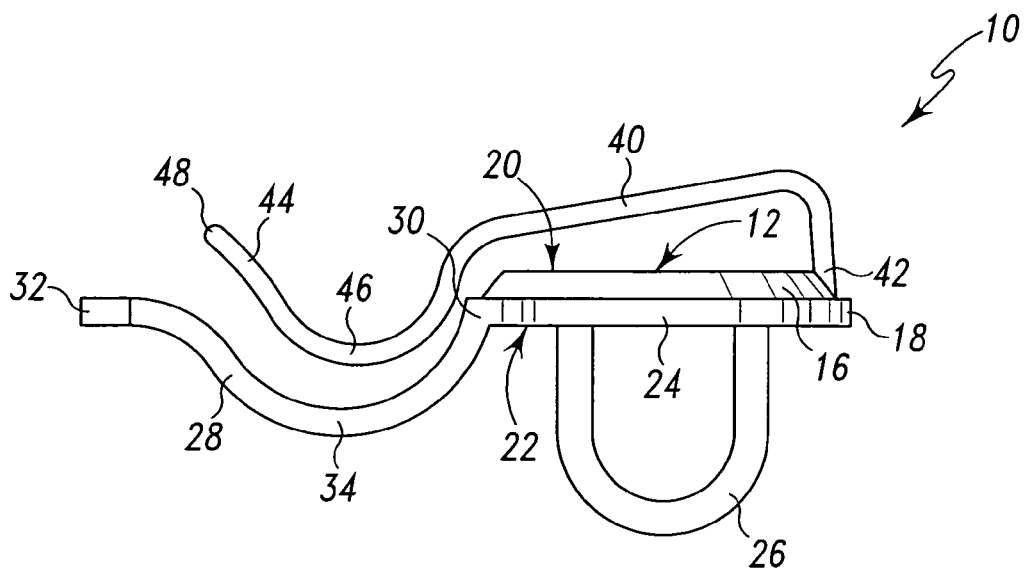
FIG. 1 is a front elevation view of a hole closing plug of the present invention.
Figure 2:
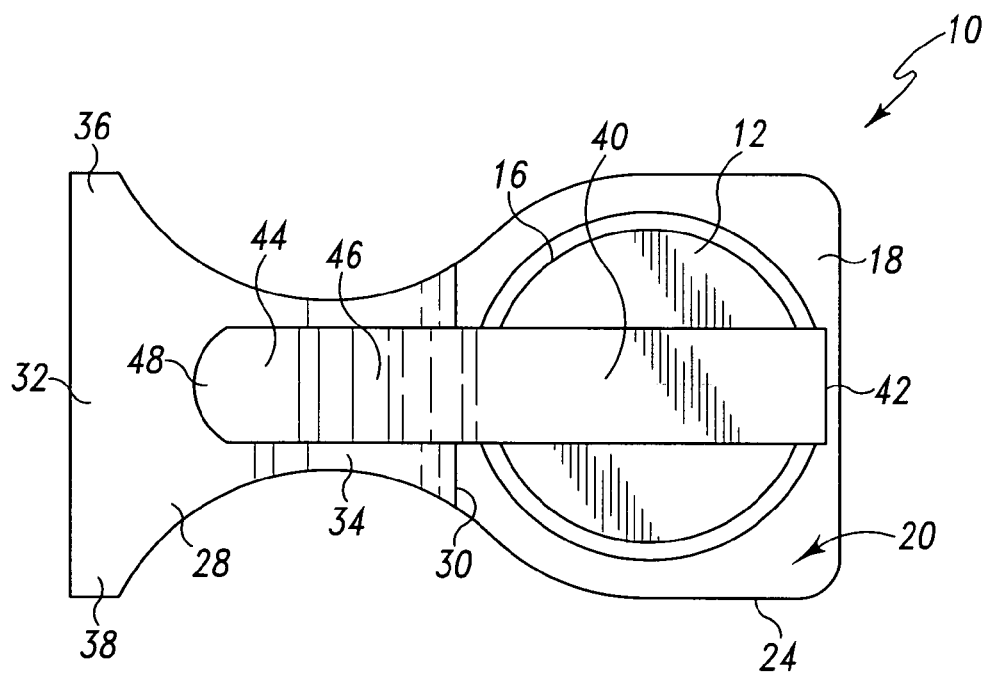
FIG. 2 is a top plan view of the hole closing plug shown in FIG. 1.
Figure 3:
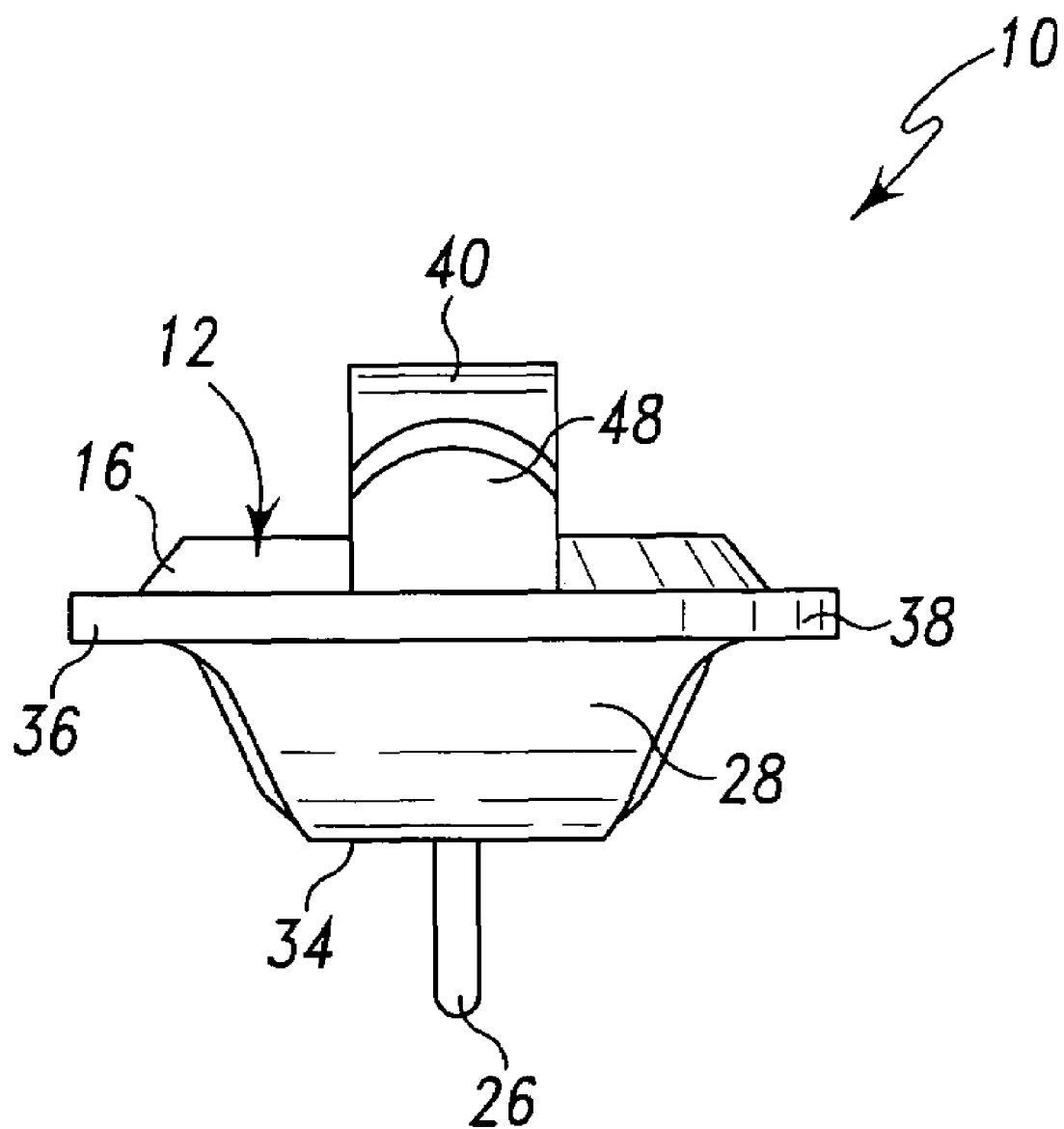
FIG. 3 is a side elevation view taken from the left side of FIG. 1.
Figure 4:
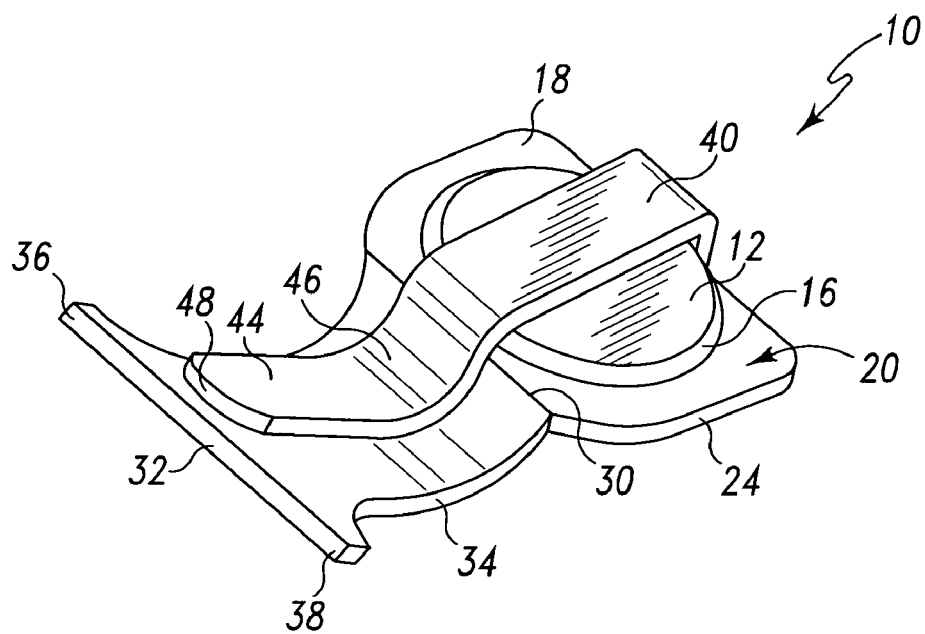
FIG. 4 is a perspective view showing the top and side of the hole closing plug of the prior figures.
Figure 5:
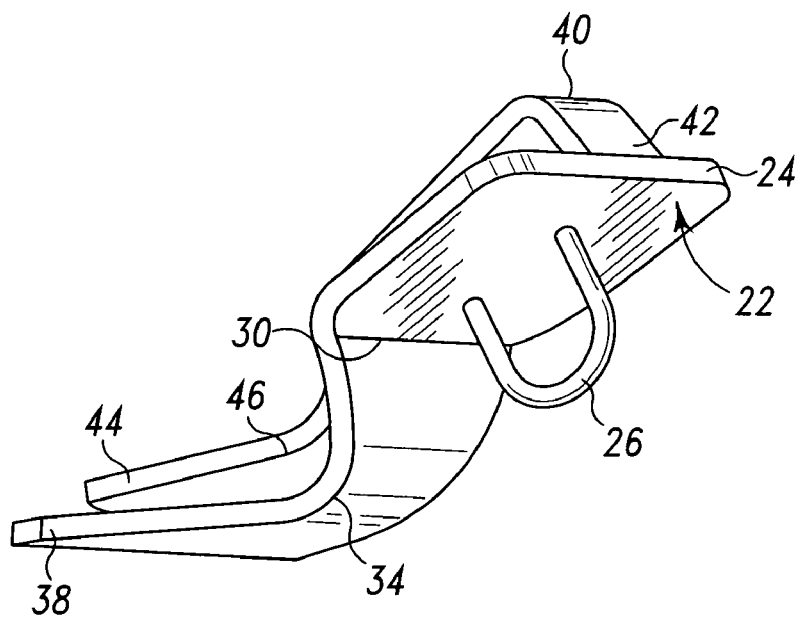
FIG. 5 is another perspective view showing the bottom and other side of the hole closing plug of the prior figures.
Figure 6:
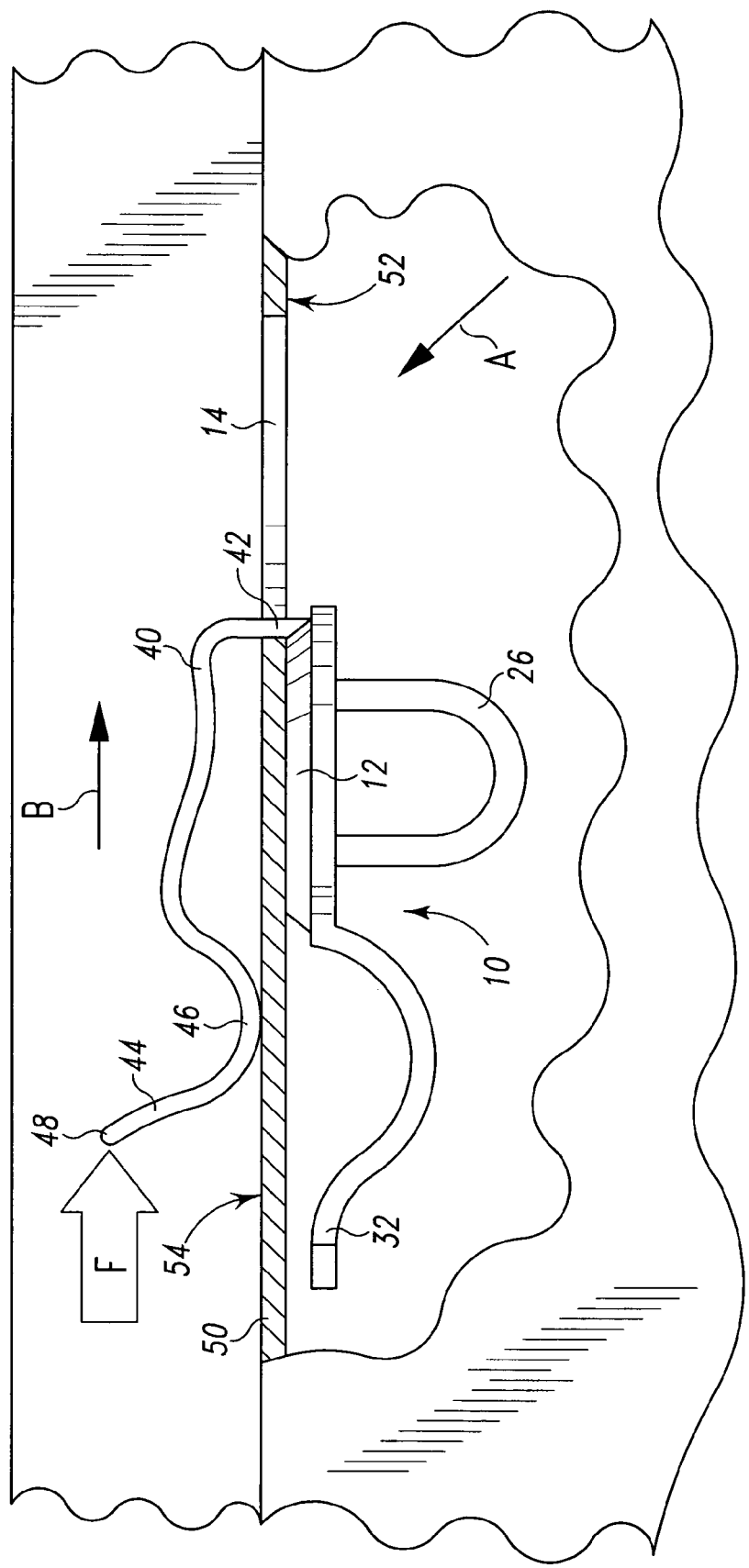
FIG. 6 is a front elevation view of a hole closing plug of the present invention similar to FIG. 1, but with a partition having a hole interposed between the spring member and the first extension.
Figure 7:
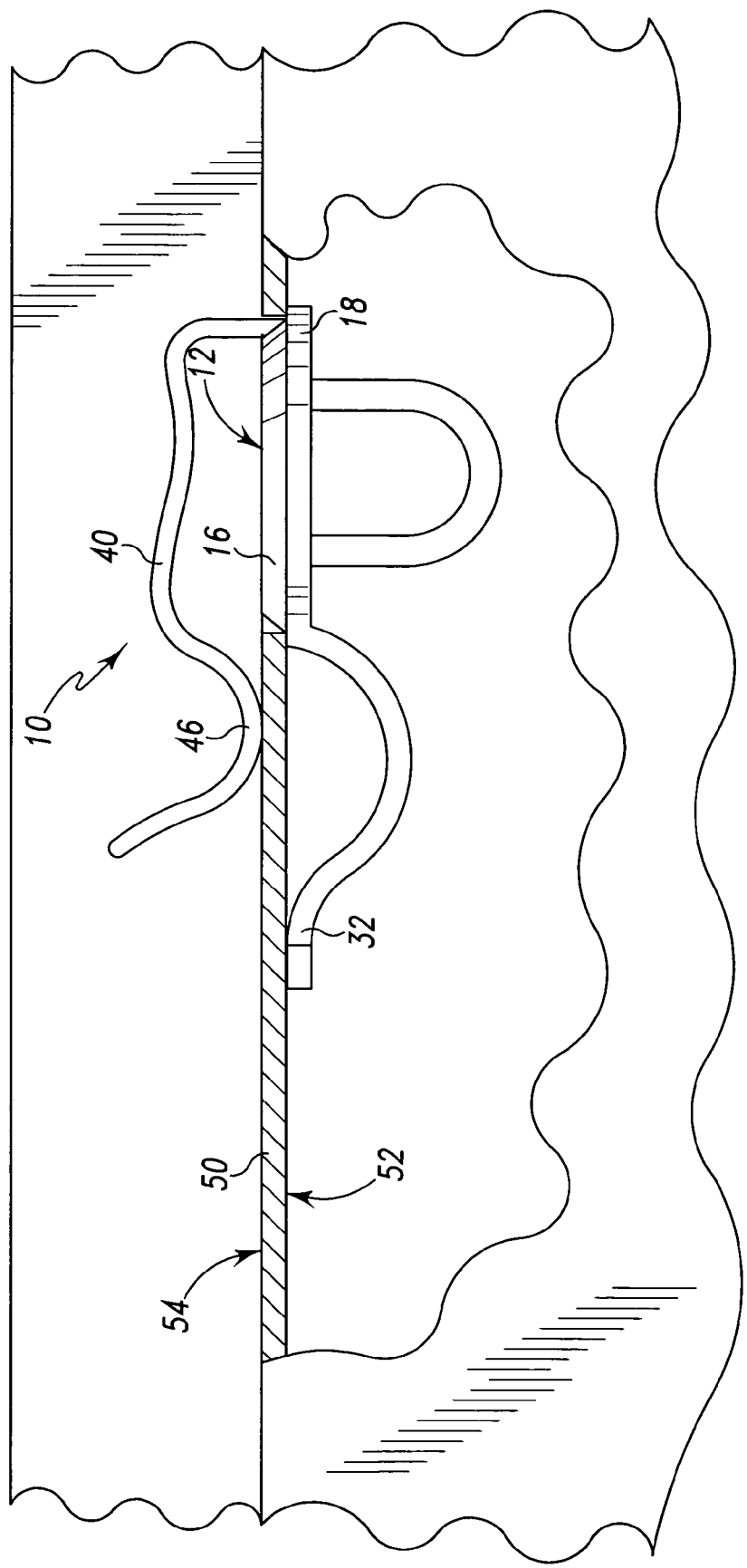
FIG. 7 is a front elevation view of a hole closing plug of the present invention similar to FIG. 1, but showing the barrier of the hole closing plug positioned in the opening in the partition.
Figure 8:
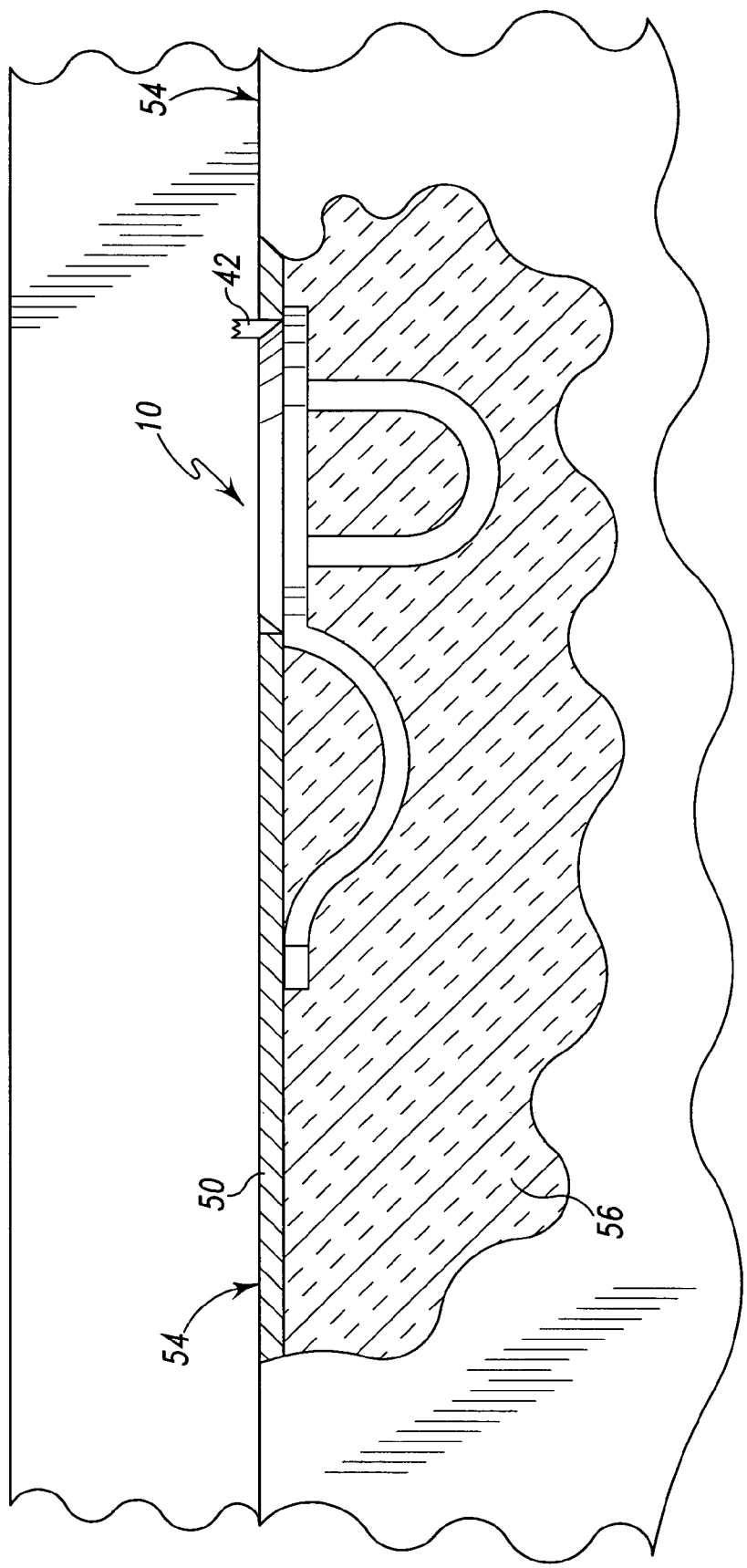
FIG. 8 is a front elevation view of a hole closing plug of the present invention situated in the opening in a partition of a hollow volume filled with an insulating foam, the spring member having been removed

A hole closing plug 10 of the present invention is shown in FIGS. 1-5 to include a barrier portion 12 which is intended to be received in a opening 14 shown in FIGS. 6-8. The barrier portion 12 is illustrated to include a generally circular tapered wall 16, which can be formed to correspond to the size and shape of the opening 14 sought to be closed with the hole closing plug 10. A flange 18 extends outwardly from the tapered wall 16 of the barrier portion 12. The flange 18 includes a first surface 20 and a second surface 22 joined by an outer edge 24. The outer edge 24 of the flange 18 can assume any shape and need not be congruent with the shape of the tapered wall 16. The barrier portion 12 is shown to protrude above the first surface 20 of the flange 18 yet is coplanar with the second surface 22. A handle 26 is coupled to surface 22 of the plug 10, which is shown lying generally in a plane perpendicular to surface 22, to permit manipulation of the plug 10 during an initial insertion operation described in connection with FIG. 6.

The plug 10 includes a first extension 28 fixed to and extending outward from a first segment 30 on the outer edge 24 of flange 18. The first extension 28 includes a remote end portion 32 and an arched portion 34 coupling the remote end portion 32 to the flange 18. The arched portion 34 is shown to be in the form of a smooth arc but can have other shapes. The remote end portion 32 is shown to lie in a plane substantially coincident with the flange first surface 20, but could be located on either side thereof. The remote end portion 32 includes laterally extending portions 36 and 38.

The plug 10 also includes a spring member 40 having a proximal end 42 coupled to the barrier tapered wall 16 at a location remote from the first segment 30. The spring member 40 has a distal end 44 overlying a portion of the flange first surface 20 and the first extension 28. The distal end 44 of the spring member 40 includes a contact portion 46 confronting the first extension 28 and a knob 48 facilitating closure of an opening 14 with the plug 10. The contact portion 44 of the spring member 40 overlies the arched portion 34 of the first extension 28, and is centrally situated with respect to the laterally extending portions 36 and 38 of the first extension 28.

The plug 10 is shown in use in FIGS. 6-8 to close an opening 14 in a partition 50, the partition having an inner or first surface 52 and a outer or second surface 54. The molded plug 10 can be conveniently grasped by handle 26 and inserted into opening 14 from the side of the first surface 52, in the direction of arrow A shown in FIG. 6, so that the distal end 44 of the spring member 40 passes into the opening 14 while the distal end 32 of the first extension 28 does not. As a result, the first extension 28 and distal end 32 of the spring member 40 are situated on opposite sides of the partition 50. The barrier 12 is positioned in contact with the first surface 52 adjacent to the partition opening 14 with the proximal end 42 of the spring member 40 extending through the partition opening 14. The spring member contact portion 46 contacts the second surface 54 of the partition 50 causing the spring member 40 to flex so as to bias the barrier 12 tightly against the first surface 52 in the position shown in FIG. 6. In some manufacturing processes, it may be desirable to pre-position the hole closing plug 10 in the position shown in FIG. 6 prior to incorporating the partition 50 into a finished structure, such as a double wall of an insulated barrier.

Subsequent to the initial pre-positioning of the plug 10, it will become desirable to use the plug 10 to quickly close the opening 14. This is easily and quickly accomplished by applying a force F to the knob 48 on the distal end 44 of spring 40 of sufficient magnitude to overcome the frictional force between the plug 10 and the surfaces 52 and 54 of partition 50. The force F causes the plug 10 to move in the direction of arrow B from the position shown in FIG. 6 to the position shown in FIG. 7. The biasing force applied by the spring member 40 biases the barrier portion 12 toward penetration of the plane defined by surface 52 while the tapered wall portion 16 acts to center the barrier portion 12 within the opening 14. The closing of the opening 14 with the plug 10 is characteristically accompanied by an audible snap as the surface 20 of the flange portion 18 comes in contact with the surface 52 of the partition 50. With the plug 10 closing the opening 14, any enclosure or barrier incorporating the partition 50 can be filled with a foam insulation 56 as shown in FIG. 8. Once the insulation 56 has hardened, the spring 40 can be removed by breaking proximal end 42 to leave a flush outer surface 54.

Of course, numerous modifications can be made to the exemplified embodiment described above without departing from the scope of the invention as defined in the following claims.

What is claimed is:

1. A method of closing an opening through a partition, the opening having an edge defining a perimeter of the opening, the method comprising the steps of:
   a) supplying a plug comprising: a flange including first and second surfaces and having a first extension on a first edge, the flange having a perimeter greater than the opening perimeter; a barrier protruding from the first surface of the flange, the barrier being surrounded by a wall having an outside surface perimeter approximating the opening perimeter; and a spring member having a proximal end coupled to the barrier on a second edge and having a distal end overlying a portion of the flange first surface including the first extension, the distal end including a contact portion,
   b) pre-positioning the first extension and distal end of the spring member on opposite sides of the partition so that the barrier is positioned adjacent to the partition opening with the proximal end of the spring member extending through the partition opening, and c) applying a force to the proximal end of the spring member in a direction and in sufficient magnitude to cause the barrier to slide toward alignment with the partition opening, the spring member biasing the barrier toward insertion into the partition opening.

2. The method of claim 1 further comprising the step of including the partition as a part of an enclosure subsequent to the pre-positioning step b).

3. The method of claim 2 further comprising the step of filling at least a part of the enclosure with an insulating foam prior to step c).

4. The method of claim 3 further comprising the step of removing the spring member from the barrier subsequent to step c).

5. The method of claim 4 further comprising the step of allowing the insulating form to harden prior to removing the spring member.

6. The method of claim 4 further comprising the step of breaking a proximal end of the spring from the plug.

7. The method of claim 1 wherein subsequent to the including step, the spring member is located on an outer surface of the enclosure while the barrier is located on an inner surface of the enclosure.

8. The method of claim 7 wherein the enclosure comprises a double wall of an insulated structure.

9. The method of claim 1 wherein the supplying step comprises forming the plug including the flange, barrier and spring member as a single unitary structure from an elastic polymeric resin.

10. The method of claim 1 comprising the step of centering the barrier within the partition opening by providing a tapered wall on the barrier for interaction with the partition opening.

11. A method of closing an opening through a partition leading to an enclosed volume, the opening having an edge defining a perimeter of the opening, the method comprising the steps of:

a) supplying a plug comprising: a flange including first and second surfaces and having a first extension on a first edge, the flange having a perimeter greater than the opening perimeter; a barrier protruding from the first surface of the flange, the barrier being surrounded by a wall having an outside surface perimeter approximating the opening perimeter; and a spring member having a proximal end coupled to the barrier on a second edge and having a distal end overlying a portion of the flange first surface including the first extension, the distal end including a contact portion, b) pre-positioning the first extension and distal end of the spring member on opposite sides of the partition so that the barrier is positioned adjacent to the partition opening within the enclosed volume with the proximal end of the spring member extending through the partition opening to a position outside the enclosed volume, c) supplying an insulating foam to the enclosed volume; and d) applying a force to the proximal end of the spring member in a direction and in sufficient magnitude to cause the barrier to slide toward alignment with the partition opening, the spring member biasing the barrier toward insertion into the partition opening to secure the foam within the enclosed volume.

12. The method of claim 11 further comprising the steps of allowing the foam within the enclosed volume to harden and subsequently removing the spring member.

13. The method of claim 12 wherein the removing step comprises the step of breaking a proximal end of the spring from the plug.

14. The method of claim 11 wherein the supplying step comprises forming the plug including the flange, barrier and spring member as a single unitary structure from an elastic polymeric resin.

15. The method of claim 11 comprising the step of centering the barrier within the partition opening by providing a tapered wall on the barrier for interaction with the partition opening.

* * * * *